(12) United States Patent
Wessels et al.

(10) Patent No.: US 10,398,251 B2
(45) Date of Patent: Sep. 3, 2019

(54) BEVERAGE PREPARATION SYSTEM AND METHOD FOR PREPARING A BEVERAGE

(71) Applicant: Koninklijke Douwe Egberts B.V., Utrecht (NL)

(72) Inventors: Hendrikus Christinus Maria Wessels, Utrecht (NL); Koen Josef van Niekerk, Utrecht (NL)

(73) Assignee: Koninklijke Douwe Egberts B.V., Utrecht (NL)

(*) Notice: Subject to any disclaimer, the term of this patent is extended or adjusted under 35 U.S.C. 154(b) by 112 days.

(21) Appl. No.: 15/009,363

(22) Filed: Jan. 28, 2016

(65) Prior Publication Data

US 2016/0143474 A1 May 26, 2016

Related U.S. Application Data

(63) Continuation of application No. PCT/NL2014/050524, filed on Jul. 28, 2014.

(30) Foreign Application Priority Data

Jul. 29, 2013 (NL) ...................................... 2011234

(51) Int. Cl.
*A47J 31/00* (2006.01)
*A47J 31/52* (2006.01)
(Continued)

(52) U.S. Cl.
CPC ......... *A47J 31/002* (2013.01); *A47J 31/4403* (2013.01); *A47J 31/52* (2013.01); *G07F 13/065* (2013.01)

(58) Field of Classification Search
CPC ...... A47J 31/52; A47J 31/4403; A47J 31/002; G07F 13/065
See application file for complete search history.

(56) References Cited

U.S. PATENT DOCUMENTS

2008/0183330 A1* 7/2008 Monn ....................... G07F 9/02
700/239
2008/0201241 A1* 8/2008 Pecoraro ................ G06Q 30/06
705/26.8
(Continued)

FOREIGN PATENT DOCUMENTS

CN          101218611 A     7/2008
CN          101730494 A     6/2010
(Continued)

OTHER PUBLICATIONS

International Search Report and Written Opinion, PCT/NL2014/050524, Koninklijke Douwe Egberts B.V., 10 pages (dated Dec. 3, 2014).

(Continued)

*Primary Examiner* — Jennifer N To
*Assistant Examiner* — Amy P Hoang
(74) *Attorney, Agent, or Firm* — Foley & Lardner LLP

(57) ABSTRACT

Disclosed is a beverage preparation system (1) with a preparation unit for preparing a beverage, with a display panel defining a screen space, and having integrated therewith a touch sensitive panel and with a control unit for controlling the preparation unit with user guidance obtained from the touch sensitive panel and for providing visual feedback to the display panel, the touch sensitive panel being arranged for generating a position signal indicative for a position pointed to. The control unit is operable in a tuning mode wherein the user is enabled to tune a beverage recipe. In the tuning mode a beverage holder (322) is displayed with a filling (3220) corresponding to a beverage recipe as well as a movable soft-button in its interior. The user is enabled to control a composition of the beverage to be prepared by moving the soft-button.

21 Claims, 11 Drawing Sheets

(51) Int. Cl.
*G07F 13/06* (2006.01)
*A47J 31/44* (2006.01)

(56) References Cited

U.S. PATENT DOCUMENTS

| | | | | |
|---|---|---|---|---|
| 2010/0138053 | A1* | 6/2010 | Kollep | A47J 31/407 |
| | | | | 700/282 |
| 2012/0035761 | A1* | 2/2012 | Tilton | G07F 13/065 |
| | | | | 700/233 |
| 2013/0164422 | A1 | 6/2013 | McCormick et al. | |
| 2014/0188271 | A1* | 7/2014 | Hernandez | B67D 1/0888 |
| | | | | 700/232 |
| 2015/0351582 | A1* | 12/2015 | Roth | A47J 31/40 |
| | | | | 426/232 |

FOREIGN PATENT DOCUMENTS

| | | |
|---|---|---|
| CN | 101842309 A | 9/2010 |
| EP | 1 749 464 | 2/2007 |
| EP | 1992263 | 5/2007 |
| WO | WO2009/135821 | 11/2009 |
| WO | WO-2009/135821 | 11/2009 |
| WO | WO2011/046428 | 4/2011 |
| WO | WO2011/046429 | 4/2011 |
| WO | WO2011/067157 | 6/2011 |
| WO | WO2011/163233 | 12/2011 |

OTHER PUBLICATIONS

English-language translation of Chinese Office Action, App. No. 2014800504139, Koninklijke Douwe Egberts B.V., 8 pages (Dec. 5, 2017).

\* cited by examiner

BEVERAGE PREPARATION SYSTEM AND METHOD FOR PREPARING A BEVERAGE

CROSS-REFERENCE TO RELATED PATENT APPLICATIONS

This application is a continuation of International Patent Application No. PCT/NL2014/050524, filed Jul. 28, 2014, which claims the benefit of priority to Netherlands Application No. NL 2011234, filed Jul. 29, 2013, all of which are hereby incorporated herein by reference in their entireties.

BACKGROUND

The invention relates to a beverage preparation system.

The invention further relates to a method for preparing a beverage.

The invention further relates to a computer program product for controlling a beverage preparation system for preparing a beverage.

The invention still further relates to a record carrier comprising the computer program product.

Nowadays, automatic devices for preparing beverages provide the user with more and more options for controlling the composition and other parameters of the beverage to deliver.

Examples of such parameters are the blend between the main product (usually coffee) and the additives (usually milk); the blend between the main product and one or more flavors; the blend of different additives (e.g., 50-50 soy milk and skimmed milk); the drink strength; the drink volume; any other parameter that influences the drink taste (e.g., temperature, foam layer, pre-infusion, pressure)

Recently devices have become available that are equipped with a plurality of containers intended for holding different types of coffee and with a blender for blending coffee from these containers according to a certain blending ratio. Typically the blending ratio is set according to a predetermined setting by the manufacturer or by an operator. In a 3 ingredient device, the ingredients may for example be mixed according to a ratio of 25%-25%-50%.

Enabling a user to control the blending ratio is considered an attractive feature, but this would make operation of the device even more complicated. It is further a complicating factor that once the process of delivering the beverage is started it cannot be undone without wastage of material, e.g., the ingredients of the beverage that was already delivered. Also, if the automatic device can only deliver the beverage with built in disposables, this implies that the cup used for the erroneously brewed delivery is lost for further use.

SUMMARY

It is an object of the present invention to provide a beverage preparation system that is controllable in a more intuitive manner, therewith mitigating the risk of erroneous control operations. This object is achieved by the system as claimed in claim 1. In the claims and the description the qualification "movable" of a soft-button is used to specify that the control unit is configured for determining whether a point of contact by a physical object on the touch-sensitive panel coincides with the soft-button, for detecting whether said coinciding point of contact moves along the composition control direction, and for updating the position of the soft-button in accordance with said movement. The physical object forming the point of contact is for example a stylus, or a user's finger operating the device.

This object is further achieved by the system as claimed in claim 12.

It is a further object of the present invention to provide a beverage preparation method that is controllable in a more intuitive manner, therewith mitigating the risk of erroneous control operations. This object is achieved by the method as claimed in claim 20.

It is a further object of the present invention to provide a computer program product for controlling a beverage preparation system that when executed by a control unit of the beverage preparation system allows the user to control the system in a more intuitive manner, therewith mitigating the risk of erroneous control operations. This object is achieved by the computer program product as claimed in claim 21.

Additionally, a record carrier according to claim 22 is provided comprising said computer program product.

A beverage preparation system according to the invention is provided with a preparation unit for preparing a beverage, with a display panel defining a screen space, and having integrated therewith a touch sensitive panel and with a control unit for controlling the preparation unit with user guidance obtained from the touch sensitive panel and for providing visual feedback to the display panel. The touch sensitive panel is arranged for generating a position signal indicative for a position pointed to. The control unit typically comprises a storage facility having stored therein beverage preparation control information for control of the preparation unit. The beverage preparation information may comprise indications for the amounts of ingredients to be used, temperature and pressure settings etc. The control unit typically also comprises a display control unit for displaying by means of the display panel a visually observable reaction to designations provided by the user. The display control unit may comprise a hardware accelerator for dedicated graphic operations.

The control unit is operable in one of one or more operational modes. At least one of these modes is a tuning mode, wherein the user is enabled to tune a beverage recipe. The beverage recipe may be preselected, for example according to a user profile and/or according to a time of the day. In the tuning mode the control unit causes the display panel to display a holder with a filling corresponding to a beverage recipe as well as a soft-button in its interior. The control unit is further configured for controlling a feature of the beverage to be prepared in accordance with the position of the at least one soft-button in said at least one control direction and for providing additional information to the user indicative of a setting for said feature as controlled in accordance with the position of the at least one soft-button in said at least one control direction.

It is not necessary that all parts of the beverage preparation system are integrated in one housing. In an embodiment the system comprises a first, portable part comprising at least a touch screen display and a second part, not necessarily portable, comprising at least the beverage preparation unit. The first portable part may be a suitably programmed handheld device, such as a mobile phone, a tablet or a PDA.

The tuning mode allows the user to see in more detail which recipe is going to be prepared. In embodiments an escape functionality may be available allowing the user to escape the tuning mode in order to select another beverage recipe. In an embodiment the at least one soft-button comprises a soft-button of which the at least one control direction comprises a first control direction, wherein the controlled feature is a relative contribution of an ingredient in the beverage in accordance with the position of the soft-button in the first control direction and wherein said additional information is an appearance of the filling in said holder. The filling in the holder is adapted according to a position of the soft-button in said first control direction resulting from said user control. The first control direction preferably is the direction which appears to the user as the vertical direction of the holder. Hence typically this direction is substantially orthogonal to a line representing the surface of the filling in the holder. The position of the soft-button in the interior of the holder and the adaptation of the filling to the position of the soft-button gives the user a good insight how the button should be used to control the composition.

Various options are possible for the adaptation of the filling to the position of the soft-button.

According one option the filling of the holder has a color that is a weighted average of a plurality of colors including at least a first color indicative for a first ingredient (e.g., a coffee or coffee blend) and a second color indicative for a second ingredient (e.g., milk or a milk blend), wherein in the applied weighting the contribution of each color in the plurality of the colors corresponds to the fraction of the ingredients indicated by said each color, wherein the first color corresponds to the fraction of the first ingredient and the contribution of the second color corresponds to the fraction of the second ingredient. For example a first ingredient may be coffee indicated by black and a second ingredient may be milk, indicated by white. As the movement of the soft-button along the first control direction causes an increase of the relative amount of the first ingredient, this may be visually indicated by a more dark appearance of the filling, whereas if the movement of the soft-button along the first control direction causes a decrease of the relative amount of the first ingredient this may be visually indicated by a more dark appearance of the filling. In this way the user can easily perceive how the filling is adapted to a change in position of the soft-button and from this perception estimate the effect on the composition of the beverage to be prepared, therewith allowing the user to intuitively control the amounts of the ingredients.

According to another option a filling of the holder is displayed with a plurality of parts representative for a plurality of ingredients and comprising at least a first part with a first appearance, for example a first color or hatching and a second part with a second appearance, for example with a second color or hatching different from the first color or hatching, that occupy respective fractions of said filling indicative for respective amounts of the first ingredient and the second ingredient of said plurality of ingredients in the beverage to be prepared. Also this option allows the user to intuitively control the amounts of the ingredients as the filling with different colored parts in the holder can be easily perceived by the user and enables the user to estimate the effect on the composition of the beverage to be prepared. Likewise the presence of a number of more than two ingredients may be represented by that number of parts of the filling. The appearance of the filling is adapted by adapting a position of a boundary between the first and the second part in said first control direction. Preferably the position of the boundary between the first and the second part of the filling is adapted to coincide with the position of the soft-button. This appears to the user as if a boundary between the first and the second part follows the movement of the first soft-button, so that the user not only can perceive the effect of moving the soft-button, but the user can also predict the effect of a movement. This further facilitates user control.

In an embodiment the at least one soft-button comprises a soft-button of which the at least one control direction comprises a second control direction, wherein the feature controlled by the position of the at least one soft-button in the second control direction is an intensity of said ingredient and wherein the additional information is a row of icons of which a number is highlighted in accordance with the intensity controlled with the soft-button.

The soft-button with the second control direction may be integral with the soft-button having the first control direction, provided that these control directions do not coincide. In that case the second control direction is preferably transverse to the first control direction. The combination of control options assigned to one soft-button extends the options of the user to adjust the features of the beverage to be prepared. The fact that the same soft-button is used for this purpose, but that the optional further movement is in a transverse direction may be used to clarify that it is associated to the same ingredient but another feature thereof.

In an embodiment the at least one soft-button comprises a soft-button of which the at least one control direction comprises a third control direction. Therein the position in the third control direction determines the amount of the beverage to be prepared. A level to which the holder is filled is preferably adapted to coincide with the position of the further soft-button. This enables the user to predict the effect of a movement of the soft-button in the third control direction. Preferably a change in the filling level does not change the composition specified for the beverage to be prepared. Accordingly in the embodiment wherein the filling of the holder is displayed with parts with mutually different appearance the ratio between the fractions that represent the contribution of the ingredients is preferably maintained constant.

In an embodiment the at least one soft-button comprises a soft-button of which the at least one control direction comprises a fourth control direction wherein a position of the soft-button in said fourth control direction determines a composition of an ingredient and wherein the additional information is a graphical representation of said composition.

In an embodiment the at least one soft-button comprises a soft-button of which the at least one control direction comprises a fifth control direction wherein a position of the soft-button in said fifth control direction determines a temperature of the beverage to be prepared, and wherein the additional information is a graphical representation of the temperature. As mentioned above, a single soft-button may be associated with more than one control direction, provided that these control directions do not coincide. Preferably in that ease associated control directions are mutually transverse.

For example the soft-button having the third control direction may also have the fifth control direction. For each additional ingredient in the beverage to be prepared a further soft-button may be provided. It is noted that for controlling the ratio between N ingredients in the beverage a total number of N−1 buttons is sufficient, so that one button remains for controlling the total amount of the beverage to be prepared.

The image data corresponding to the selected recipe may be supplemented with textual data describing the recipe. If the user substantially changes the recipe by using the further control options in the tuning mode, this textual information may be faded away. This may be the case if the user sets one or more features of the beverage to be prepared to a value that deviates more than a predetermined amount (e.g., more than 10%) from a reference value.

In an embodiment the beverage preparation system has a selection mode preceding the tuning mode. In the selection mode the user is enabled to select a recipe, which recipe can be tuned in the tuning mode before it is used for preparing the beverage. In the selection mode the user may for example select the recipe from a menu, such as a hierarchically organized menu. Various graphical user interfaces enabling selection of a recipe are disclosed in WO/2011/046428 and WO/2011/046429 from the same Applicant. Further embodiments including novel implementations of the selection mode are described below.

In an embodiment of the beverage preparation system according to the present invention beverage preparation control information is stored as a sequence of selectable beverage recipes. In that embodiment the set of potential operational mode includes a selection mode M1 wherein the control unit is configured for mapping image data corresponding to respective beverage recipes from said sequence in respective regions in a recipe selection zone of the display panel in a predetermined order at mapping positions along a mapping direction of said recipe selection zone; detecting whether a movement of a physical object on or near the touch sensitive display panel along the mapping direction occurs; upon detection of such a movement applying a corresponding change in the mapping position of recipe images; for enabling the user to select a beverage recipe from beverage recipes presented by their corresponding recipe image in the recipe selection zone.

The recipe selection zone is typically an elongate zone, so that a plurality of recipes can be represented by their recipe image. In that case, the mapping direction is typically a length direction of the elongate zone. The predetermined order wherein the recipe images are displayed is for example the order in which the recipes occur in the stored sequence. Recipe images that would be mapped to regions at mapping positions outside the recipe selection zone are not displayed. When the motion detection module detects a movement of the physical object along the mapping direction of the recipe selection zone, it causes the mapping module to apply a corresponding change in the mapping position of recipe images. The user is enabled to select a beverage recipe from beverage recipes presented by their corresponding recipe image in the recipe selection zone.

The mapping of image data for the beverages is user controllable by making a swiping motion along the mapping direction, e.g., a length direction if the recipe selection zone is an elongate zone. Upon detection of such motion the control unit causes a corresponding change in the mapping position of the recipe images. Therewith recipe images in the sequence for which the mapping position is moved into the recipe selection zone become visible, whereas recipe images in the sequence for which the mapping position is moved outside the recipe selection zone are hidden. Accordingly, in case a large sequence of recipes is available for selection, a pre-selection thereof can be shown in more detail as a subsequence in the recipe selection zone. Therewith the user has a more clear impression of the beverage that would be prepared upon selection than would be the case if the entire sequence were visualized. Furthermore the capability of recognizing a swiping movement and accordingly adapting the mapping position enables the user to easily and intuitively control which part of the sequence is visualized. The mapping position may be adapted in various ways. In an embodiment the mapping position takes place stepwise. This has the effect that at each swiping movement a next subsequence of the sequence is displayed in the recipe selection zone.

Alternatively, the mapping position may be gradually updated in accordance with the user input. This has the effect that each time all recipe images shift in the mapping direction of the recipe selection zone, wherein at one end a recipe image shifts out of the recipe selection zone and at the other end a recipe image shifts into the recipe selection zone. The shifting movement may be visualized by a stepwise or by a smooth movement of the recipe images in the direction wherein swiping takes place. The sequence of beverage recipes may be arranged as a finite sequence. In that case the corresponding sequence of recipe images can be moved in the length direction of the elongate zone until the beginning or the end thereof is reached. This has the advantage that the user can easily determine the range of possible options. Alternatively, the sequence of recipe images may be arranged as a cyclic sequence. In that case the corresponding sequence of visual representations can be moved without limit, wherein the last recipe image in the sequence is followed by the first recipe image. This has the advantage that the user can always swipe in the same direction to arrive at the desired recipe.

In an embodiment the control unit has a transitory operational mode preceding the first operational mode wherein a series of recipe images slides into the elongate zone from one end thereof. Subsequently the beverage preparation system assumes the first operational mode when the sliding movement is completed. This transitory operational mode helps making the user aware that more beverage recipes may be available and that the user can visualize these by making a swiping movement.

In an embodiment the sliding movement is accompanied by a highlight moving along a path alongside the series of corresponding image data in a direction opposite to the sliding movement. This additional movement in a direction opposite of the sliding movement even more raises the awareness of the user.

In an embodiment the beverage preparation system the control unit is further configured for determining if a region in the recipe selection zone is selected, and for upon such detection assuming the tuning mode. Upon detection that a region is selected in the recipe selection zone when the control unit is in the selection mode, the control unit assumes the tuning mode, in which the beverage recipe corresponding to said region is selected and image data corresponding to said beverage recipe is displayed. Nevertheless, embodiments are possible wherein the tuning mode is skipped or absent and the beverage preparation system starts preparation of a beverage once the recipe therefore is selected. The user may select one of the beverage recipes presented in the elongate zone, for example by selecting a display region in the recipe selection zone showing the corresponding recipe image. The control unit may determine that a display region is selected if the region is indicated longer than a predetermined time, or if the user exerts a pressure within said region. Alternatively the region may be a predetermined region, e.g., in the middle of the elongate zone or a candidate region which is accentuated, e.g., by highlighting and the user may indicate selection by otherwise providing a confirmation, e.g., by pressing a hard or soft confirmation button to acknowledge that the recipe represented by its image in the predetermined region or the candidate region is selected.

In another embodiment the control unit is configured for mapping an image of a three-dimensional body, the user being enabled to indicate a position on the mapped image, in which selection mode the beverage preparation system is configured for identifying a region on the three-dimensional body from the indication of the position pointed to and for selecting one or more beverage recipes associated with said region.

The three-dimensional body is for example a sphere, for example a globe.

The corresponding selectable beverages may be beverages that are traditional for said region, for example coffee recipes as Lungo, Expresso and Latte Macchiato, when a position is indicated within the country Italy. Alternatively the selection may be based on the availability of certain ingredients in the region of origin pointed to by the user. For example Robusta coffee may be selected by pointing to sub-Saharan Africa or an Arabica coffee may be selected by pointing to the Arabian Peninsula. Alternatively the correspondence may be found in the physical circumstances of the region pointed to. For example indication by the user of one of the poles may correspond to the selection of ice water.

Preferably, the three-dimensional body has a user controllable orientation in that the control unit is configured for determining a movement of a point of contact by a physical object on the touch-sensitive panel and for providing a mapping wherein the three-dimensional body is rotated around an axis, which rotation causes a mapped surface of the three-dimensional body to displace in a direction corresponding to the direction of movement of the point of contact.

Depending on the region on the globe indicated by the user, one or more selectable beverages may be available. If the indication results in exactly one selectable beverage recipe, the user can subsequently tune this recipe in the tuning mode. If more than one recipe is available for the indicated position the user may be enabled to select one from the available recipes for example using one of the other selection procedures referred to above. Instead of a sphere another three-dimensional body may be used, e.g., a polyhedron. Therein each face of the polyhedron may be a region representing a set of one or more selectable beverages. It is not necessary that the tuning mode is preceded by a selection. In other embodiments the beverage preparation system may provide a predetermined selection, which can be tuned to the desired specification. In again other embodiments a predetermined selection may be user customized on the basis of a user profile. The user profile may have user profile data for different time slots. The beverage preparation system may have facilities that recognize the user, for example by face recognition, fingerprint recognition or by performing an iris scan. Alternatively, the user may be identified from a badge, e.g., by RFID technology. In again another embodiment the user may control the beverage preparation device using a handheld device, comprising the user profile data. Based on the recognition and a determination of the time of the day, the beverage preparation system may provide a predetermined selection, which can be tuned to the desired specification. In an embodiment the beverage preparation system may provide for an escape functionality allowing the user to set aside the predefined selection and to select another beverage recipe, e.g., using one of the embodiments described above for example.

BRIEF DESCRIPTION OF THE DRAWINGS

These and other aspects are described in more detail with reference to the drawing. Therein.

DETAILED DESCRIPTION

Figure 1:
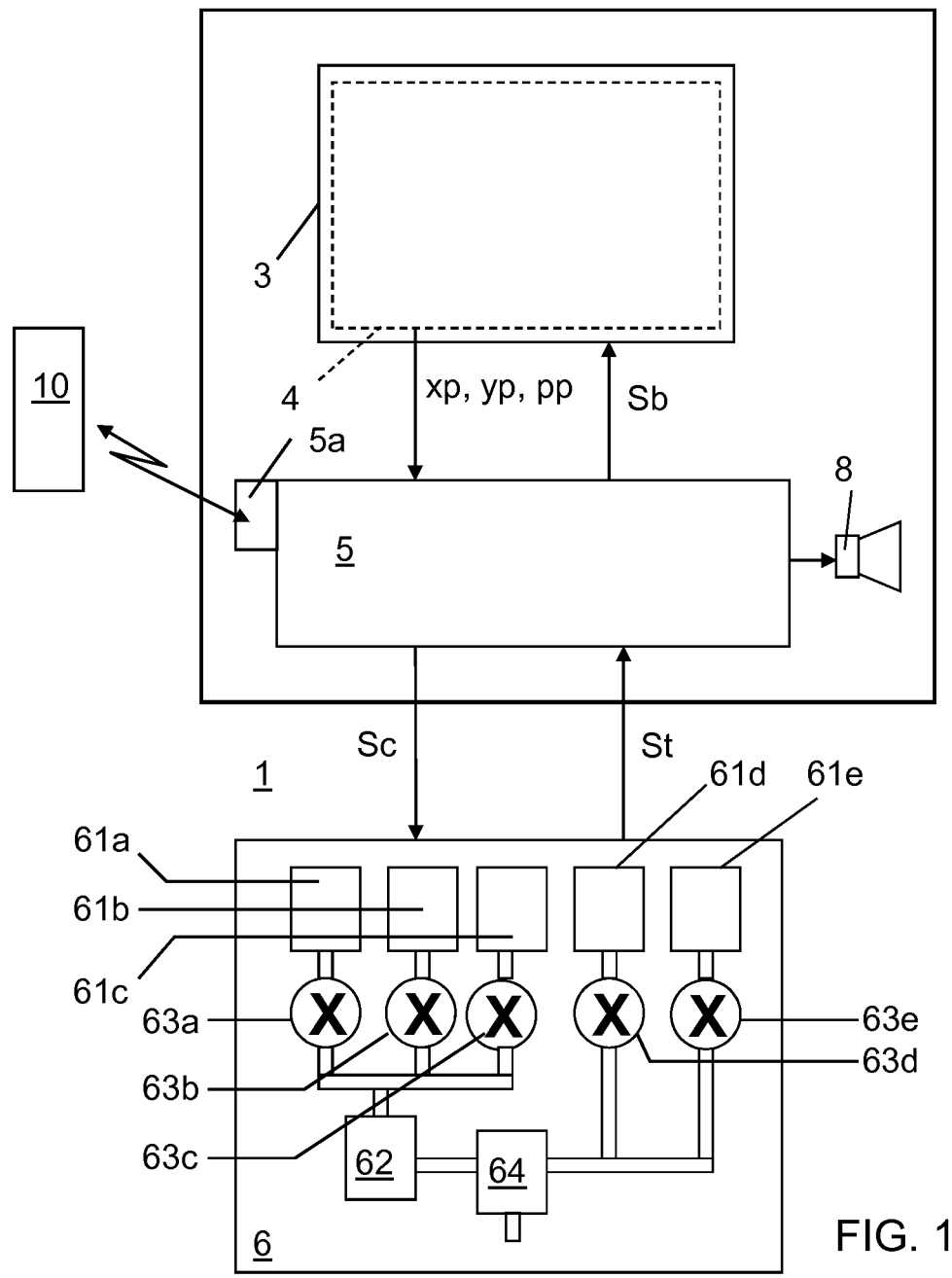
FIG. 1 schematically shows an embodiment of an automatic system for preparing a beverage.

In the following detailed description numerous specific details are set out to provide for a thorough understanding of the present invention. It will be clear to the skilled person that these details are not essential to the present invention. In other instances, generally known methods, procedures and components are not described in detail to thereby avoid more essential aspects of the invention being veiled.

It will be clear to the skilled person that the terms "first", "second", "third" in this description can be used to distinguish parts from each other, without thereby indicating any priority. Hence, a first element, component, area, field, module, etc., could also be called a second element, component, area, field, module, etc., without departing from the scope of protection of the present application.

In the drawings, parts are normally not shown to scale. In some instances, parts are shown in a magnified representation for clarity.

Unless indicated otherwise, all terms have the meaning given to them by the person skilled in the art of the present invention, Further, terms such as they are defined in commonly used reference works and dictionaries are understood to be interpreted in accordance with their meaning in the context of the technical field relevant in this ease and not to be interpreted in an idealized or unduly formal sense, unless expressly indicated otherwise. In the event of a difference in interpretation of a term, the interpretation given to it by the present application shall be decisive.

Corresponding parts have mutually corresponding reference numerals.

FIG. 1 schematically shows an embodiment of an automatic system 1 for preparing a beverage. The system 1 is provided with a preparation unit 6 with a display panel 3 having integrated therewith a touch sensitive panel 4 and with a control unit 5. The control unit 5 is arranged for controlling the preparation unit with user guidance obtained from the touch sensitive panel 4. The control unit is further arranged for providing visual feedback to the display panel 3. Therewith the preparation unit 6 is configured for preparing a beverage according to a formulation specified by a user. The control unit may further give audio feedback via speaker 8. The preparation unit 6 can prepare, for example, a plurality of beverages such as water, tea, coffee, chocolate milk and soup. In a practical embodiment, the beverages can be provided with additions, such as sugar, milk and aromas. If desired, also a temperature of the beverage to be poured can be set. In an embodiment, the preparation unit 6 is provided with inter alia holders 61*a*, 61*b*, 61*c* for storage of various types of coffee, and holders 61*d*, 61*e* for other ingredients such as sugar and milk and possibly one or more flavors such as caramel, hazelnut or vanilla. It is noted that ingredients may be present in the holders as a raw material, nut otherwise may be preprocessed. For example coffee may be present in the form of beans, ground beans or as a solution. The embodiment shown is furthermore provided with a heating unit 62, dosing valves 63*a*-63*e* for dosing the ingredients from the respective holders 61*a*-61*e* and a beverage outlet 84.

Upon touching, the touch-panel 4 delivers a position signal xp, yp, which is indicative of the position where the display panel 3 has been touched. The touch-panel 4 may further provide a pressure signal pp indicative for a pressure with which a position indicated by xp, yp is touched. Alternatively or in addition, the user may be enabled to designate a position on the display panel in a noncontact manner, for example, by pointing at that position, or by giving spoken commands. To this end, the control unit 5 receives the position signal xp, yp from the input means, and the control unit 5 controls the display panel with an image signal Sb. The control unit 5 controls the preparation unit with control signals Sc. In addition, the control unit 5 can receive condition signals St from the preparation unit 6 which are indicative of a condition of the preparation unit. The condition signals St can indicate, for example, the filling degree of the holders 61*a*, 61*b*, 61*c*, or the height of a temperature reached by the heating unit 62.

The beverage preparation system may have all its components integrated in a single housing, but that is not necessary. In an embodiment the system comprises a first, portable part 10 comprising at least a touch screen display and a second part, not necessarily portable, comprising at least the beverage preparation unit. The second part in that case comprises a communication module 5*a* for allowing wireless communication with the portable part, as shown schematically in FIG. 1. The first portable part may be a suitably programmed handheld device, such as a mobile phone, a tablet or a PDA. In case the beverage preparation device 1 is controllable by a portable device it is not necessary that the beverage preparation device is provided with a display and associated touch sensitive panel as these facilities are already available in the portable device 10. Also part of the functions of the controller 5 may be taken over by portable device. Nevertheless it is advantageous if the beverage preparation device includes the touch screen display panel and all functions of the controller, so that the beverage preparation device can also be operated standalone.

Figure 2:
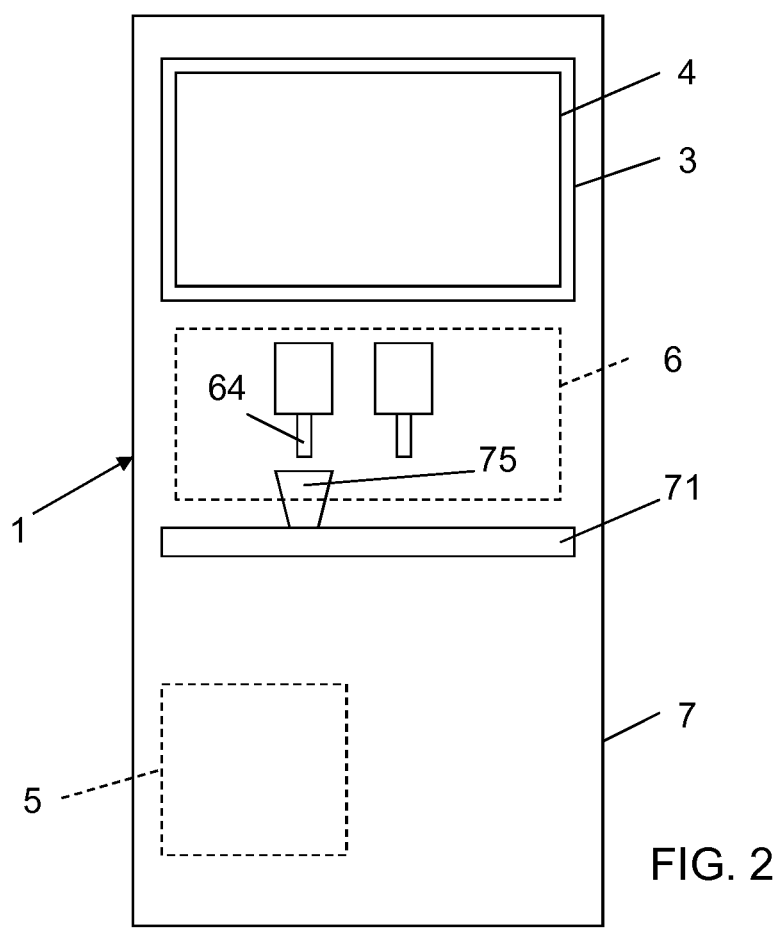
FIG. 2 shows a practical setup of components of the automatic system, FIG. 3 schematically shows a state diagram of the control unit of an embodiment of the system of FIGS. 1 and 2, FIG. 4 schematically shows a user interface available in a standby mode of the control unit, FIG. 5 schematically shows a user interface available in a further mode of the control unit, FIG. 5A schematically shows a mapping of information to a part of the display in said further mode, FIG. 5B schematically shows a further mapping of information to said part of the display in the same mode after user input is received, FIG. 6A schematically shows a user interface available in a first phase of a still further mode of the control unit, FIG. 6B schematically shows a user interface available in a second phase of said still further mode of the control unit, FIGS. 6C and 6D schematically show states of a user interface available in an operational mode of the control unit of another embodiment, FIG. 7 schematically shows a user interface available in again a further mode of the control unit, FIG. 8 schematically shows a user interface available in an operational mode of a further embodiment of a beverage preparation system according to the present invention.

FIG. 2 shows a practical setup of components of the automatic device. Parts therein that correspond to those from FIG. 1 have the same reference. In the practical embodiment shown, the device has a housing 7 for the parts shown in FIG. 1. The housing 7, furthermore, has a support 71 for supporting a beaker 75. The beaker 75 can be placed there, for example, by the user or by a placing mechanism.

Figure 3:
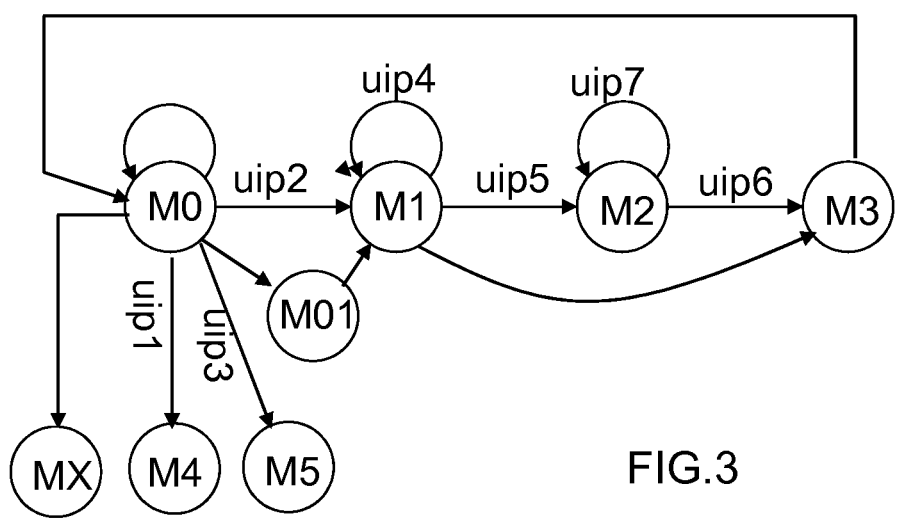
Figure 4:
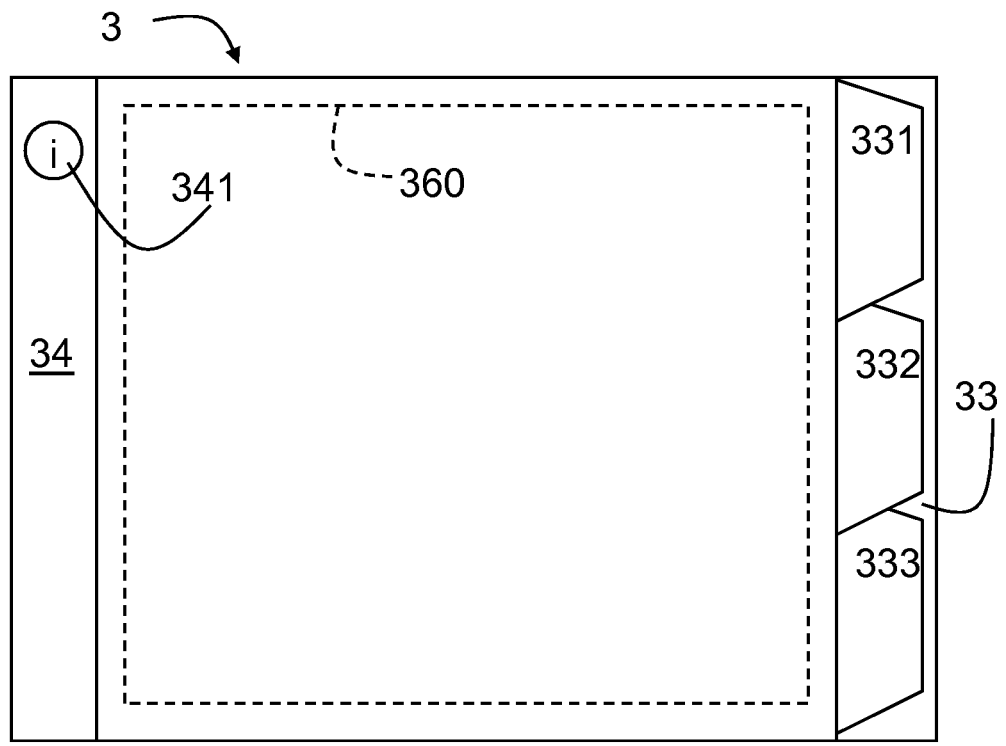
Figure 5:
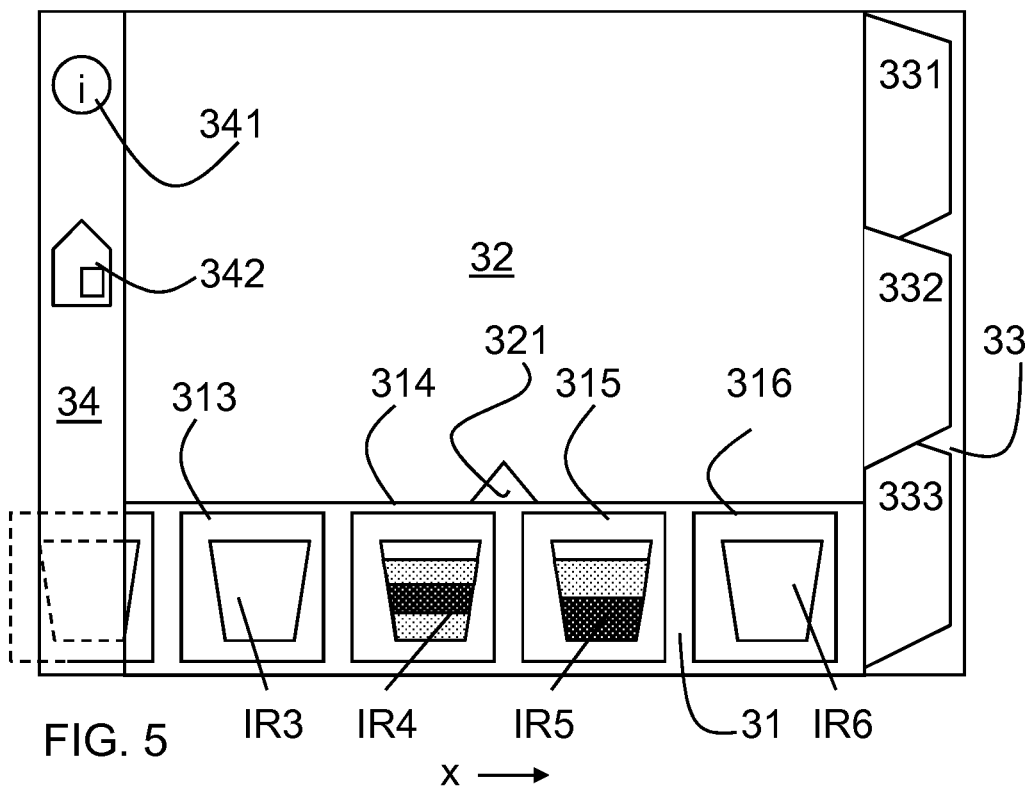
Figure 5A:
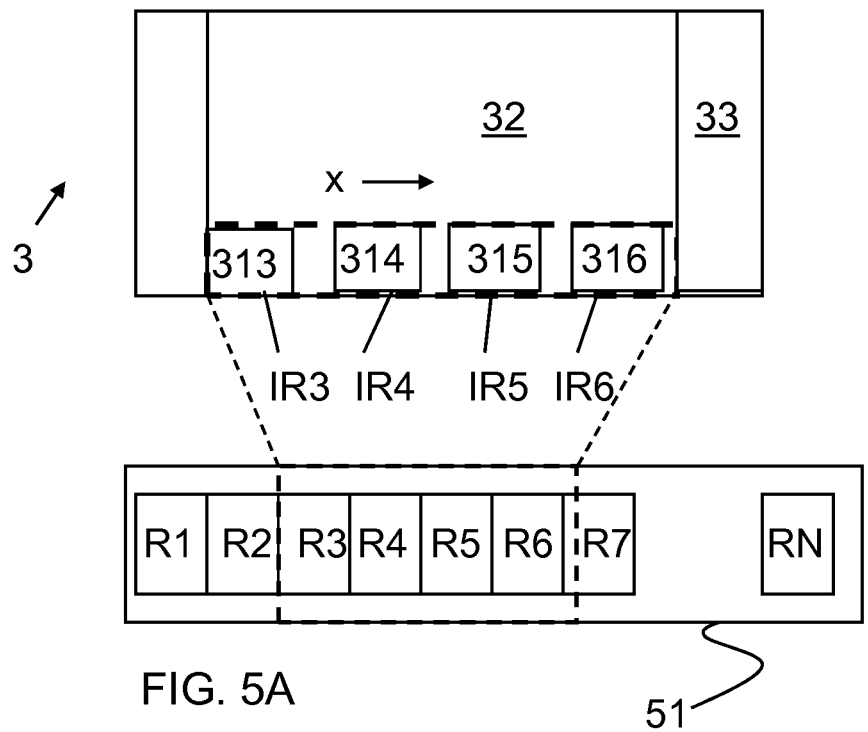
Figure 5B:
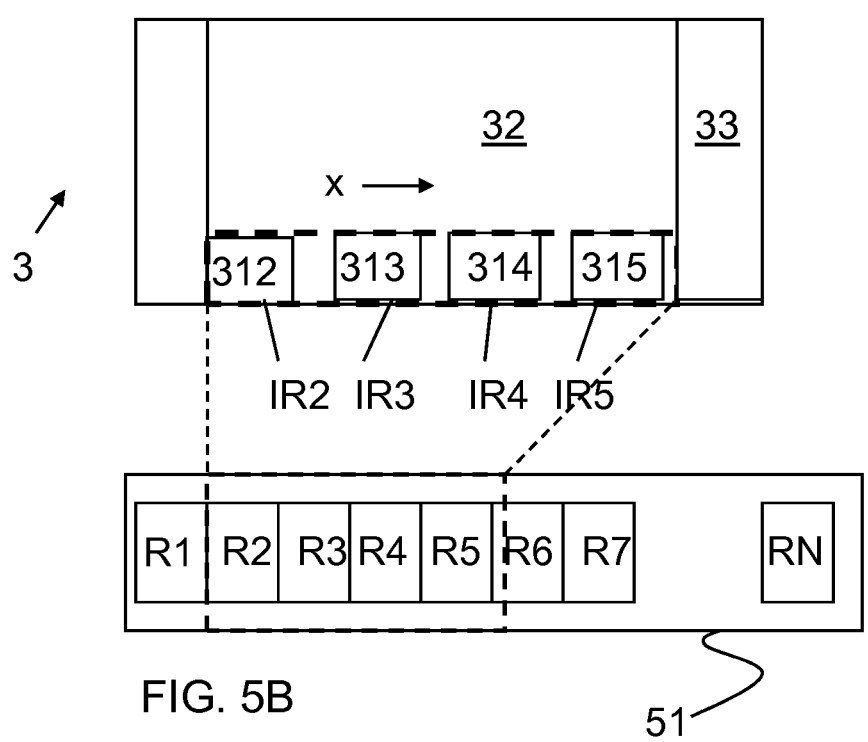
Figure 10:
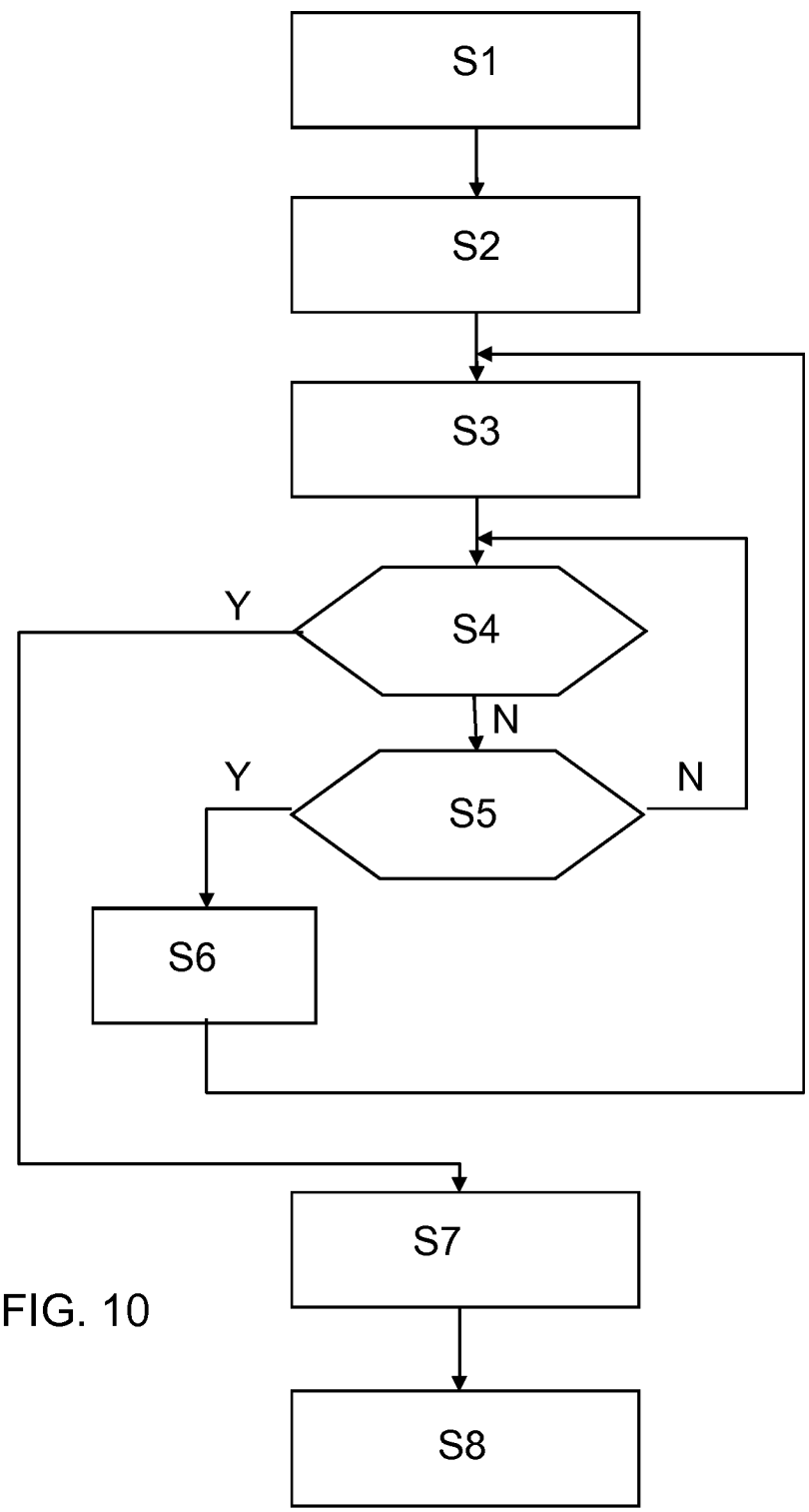

FIG. 3 schematically shows a state diagram of the control unit 5 in an embodiment of the beverage preparation device 1. Therein operational mode M0 represents a standby mode wherein the control unit 5 awaits input from a user. In this operational mode a screen, e.g., as in FIG. 4, may be displayed providing various input modes available to the user to control the apparatus. In this example the display 3 shows selectable tabs 331, 332, 333 in a right edge 33. A left edge 34 of the display may include a soft-button 341 enabling a user to request information. The information may be made available by 'pressing' this button or more easily by merely pointing to the button 341. A background image 360 is shown, that in embodiments may extend over the edges 33, 34 of the screen. The background image 360 may remain also in other operational modes. In the absence of user input (indicated by the circular arc) the control unit remains in the standby mode S0. Selection of one of the tabs 331, 332, 333 corresponds to user input uip1, uip2, uip3 respectively, which causes a transition to modes M4, M1, M5 respectively. Once standby mode M0 is left a home icon 342 may be presented on a fixed location on the display to allow a user to return to this mode any time. Operational mode M1 resulting from the transition after user input uip2 will now be described in more detail with reference to FIGS. 5, 5A and 5B. For clarity modes M4, M5 will not be further described. In operational mode M1 recipe image data for respective beverage recipes, here R3 to R6 from the sequence of stored recipes is mapped to screen space and displayed as recipe images, here IR3 to IR6, in respective regions 313 to 316 in an elongated zone 31 of the display panel 3 (See FIG. 5) at mapping positions along the length direction of said elongate zone. The control unit 5 may have a mapping module 53 for this purpose as shown in FIG. 10. The recipe images IR3 to IR6 are arranged in a predetermined order, for example the order in which the recipes occur in the stored sequence. The mapping is schematically illustrated in FIG. 5A. Therein R1 to RN are a sequence of recipes and their image data stored in memory 51, of which currently recipes R3 to R6 are visualized in a zone 31. In this case the zone 31 is an elongate zone, more in particular a rectangular zone, and its length direction extends along the x-axis of the display 3. Alternatively, the elongate zone may have another shape, e.g., a meandering shape. In that case the length direction is preferably extends along the heart line of the meandering shape. In operational mode M1 the control unit 5 changes the mapping position of the recipe images upon detection of a motion of an indicated position along the length direction of the elongate zone 31. A motion detected by control unit 5 is indicated as user input uip4 in the state diagram of FIG. 3. For example, if the user makes a swiping movement in a direction from left to right this may have the effect that the mapping position of recipe images and the associated selection fields of the corresponding recipes are also moved to the right as is shown schematically in FIG. 5B. Therewith one or more new beverage recipes may be introduced at the left side, whereas other beverage recipes may disappear at the right side. For example, upon detection of this swiping movement, the subsequence R2, R3, R4, R5 of recipes is now visualized as images IR2 to IR5 in respective regions 312 to 315 and becomes selectable, so that it appears that the sequence of images has followed the swiping movement of the user's finger. Various options are possible to control the mapping and to visualize the selection. The example illustrated in FIGS. 5A, 5B represents a relatively fine-grained stepwise adaptation of the mapping. Therein each time one new recipe, here R2, is represented by its image, here IR2 and the image, here IR6 for one recipe, here recipe R6 disappears. According to another option, the mapping module 53 provides for a relatively course stepwise adaptation of the mapping position. For example when recipe images IR1, IR2, IR3 for recipes R1, R2, R3, are replaced by recipe images IR4, IR5, IR6 for recipes R4, R5 and R6 upon swiping to the left etc. In a preferred embodiment an adaptation of the mapping is visualized as a continuous movement, wherein it appears as if a series of recipe images slide through the elongate zone 31 of the display 3, as if the images were attached to a carousel. In the embodiment shown the recipe images IRi of the recipes Ri in the subsequence may be assigned a position $x(i)=Offs+i*W$. Therein W is a width of the respective recipe images and Offs is a variable that can be substantially continuously varied, at least in steps substantially smaller than the width W, e.g., 10 times smaller. The position indicated by x(i) is for example the lower-left corner of the images or another reference position.

The assigned regions 313, 314, etc. for the recipe images IR3, IR4 preferably have a fixed size but that is not mandatory. For example some recipe images may be assigned a larger region than others. The size may also be dependent on the position of the recipe image within the elongate zone. For example images halfway the elongate zone may be larger than images at the ends of the elongate zone. An indicator 321 may be present for indicating which beverage recipe Rn is currently selected. In case no beverage is selected yet, this may be indicated by positioning the series of recipe images so that the indicator 321 is somewhere between two subsequent recipe images, in the example of FIG. 5 between the recipe images IR4 and IR5.

$$X(i)=Offs+i*D$$

As mentioned above, it is not necessary that the position X(i) is a position along a straight line, e.g., parallel to the horizontal or vertical axis of the screen. Alternatively, the position X(i) may be a position along a curved trajectory, e.g., a circle. An elongate zone along a curved, e.g., meandering trajectory would have the advantage that a larger number of beverage images can presented within the elongate zone. The speed with which the beverage images move along the length direction of the elongate zone is $v_{Offs}=dOffs/dt$ $$V_{Offs} = \frac{dOffs}{dt}$$

The mapping module 53 of FIG. 10 may have a clipping sub-module that determines which recipe images would be mapped outside the elongate zone 31. This is superfluous if the elongate zone ends at the edges of the display. A movement induced in the mapping position X(i) may have substantially the same speed as a speed detected by the control unit 5, so that a recipe image pointed to appears to follow a user's finger when the latter is moving, but this is not necessary. Alternatively, the speed $v_{Offs}$ may be a more complex function of the detected speed. Also a value for $v_{Offs}$ may be selected from fixed values, e.g., a speed $v_{Offs}=0$ if no motion is detected and a fixed non-zero speed $v_{Offs}$ if a motion is detected.

A suggestion of mass and friction may be given by applying a motion model. For example, if the control unit 5 detects no further motion, the speed $v_{Offs}$ may decline according to the following differential equation:

$$dV_{Offs}/dt=-c \cdot v_{Offs}$$

This has the effect that the sequence of recipe images displayed in the elongate zone gradually slows down, if a movement is no longer induced by the user.

Further refinements may be added. For example, the movement of the sequence of images may be automatically stopped if the end of the sequence is reached, e.g., in order to prevent that beverage items disappear at one end from the elongate zone, whereas at the other end no new items can be introduced. Stopping the movement may be preceded by a vibrating movement as if the sequence of recipe images bounces at an edge.

At any point in time the user may be enabled to select a beverage recipe by user input uip5 from the recipes represented by their corresponding recipe images, for example by selecting a display region in the elongate zone 31 showing the corresponding recipe image. A display region may be considered selected if the region is indicated longer than a predetermined time, or if the user exerts a pressure within said region. Alternatively the region may be a predetermined region, e.g., in the middle of the elongate zone or a candidate region which is accentuated, e.g., by highlighting and the user may indicate selection by otherwise providing a confirmation, e.g., by pressing a hard or soft confirmation button.

Upon selection by user input uip5 the control unit assumes a second operational mode M2. In an embodiment, upon assuming the second operational mode M2 the preparation unit 6 of the beverage preparation device 1 may be controlled to start preparing the beverage corresponding to the selected recipe. In this case a further confirmation uip6 is requested before preparation is started. The user is further enabled to tune the recipe by providing further input uip7. By way of example the transition to mode M2 is visualized by the screen illustrated in FIG. 6A. In the embodiment the recipe image, in this example IR4 for the beverage recipe R4 selected from the subsequence is displayed in a zone 32 separate from the elongate zone 31. The user can now see in more detail what recipe is going to be prepared and can if required still select another beverage recipe from the subsequence of recipes visualized in the elongate zone 31. In an embodiment the beverage recipe specifies at least a first and a second ingredient and in the second operational mode M2 a holder 322 for a beverage is presented filled for a first fraction 3221 with a first color indicative for the first ingredient (e.g., a coffee blend) and for a second fraction 3222 with a second color indicative for the second ingredient (e.g., milk). This very clearly informs the user about the beverage that is up to be prepared. The filling fractions may correspond to the fractions in which the respective ingredients will be present in the beverage to be prepared.

Figure 6A:
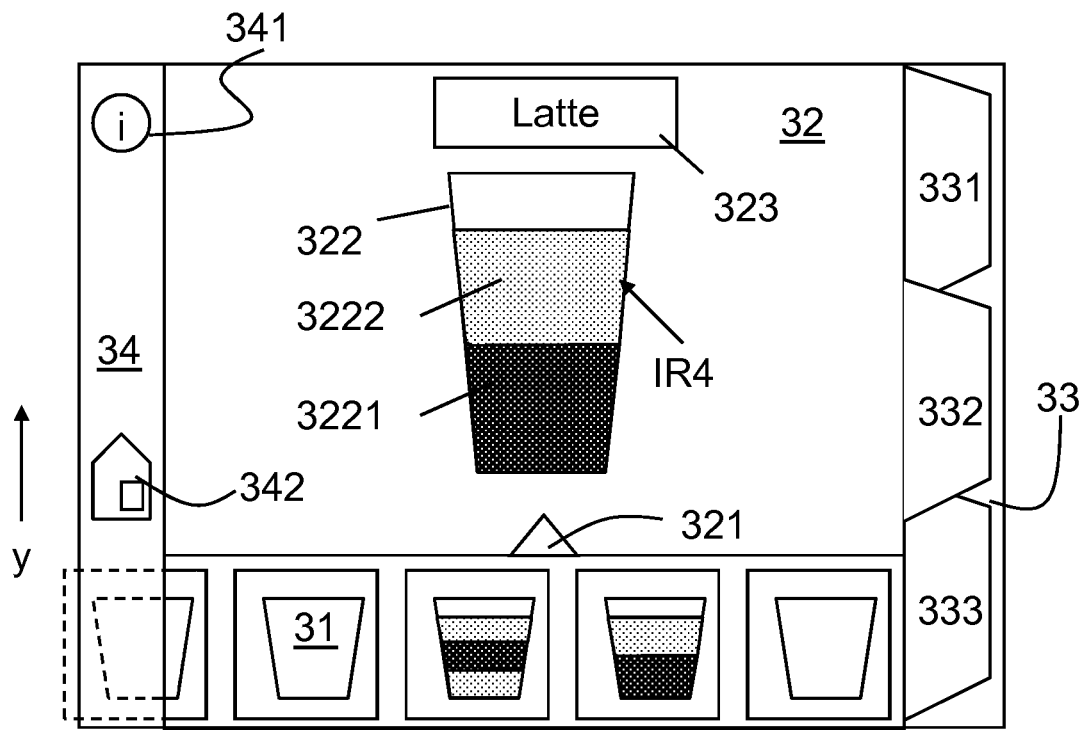

Additionally textual information, here the description "Latte" is presented indicative for the selected recipe in an information box 323. In the embodiment shown in FIG. 6B, the user is also provided with further control options for adjusting the recipe before preparation is started. In the present embodiment the screen illustrated in FIG. 6B appears automatically after the screen according to FIG. 6A, e.g., in a time period from 0.5 to 1 sec. The transition to the screen of FIG. 6B may take place by fading in the additional objects shown in FIG. 6B. Alternatively the intermediary screen as shown in FIG. 6A may be skipped. In the example shown in FIG. 6B a first soft-button 324 is provided in the second operational mode M2 that is at least movable in a direction corresponding to the vertical direction of the holder (direction y) and further also denoted as first control direction. Therein the vertical position determines the contribution of the first ingredient in the beverage to be prepared. The motion detection module 52 is capable of detecting that a display region wherein the soft-button 324 is displayed on the screen is pointed to and that the pointed position moves from said display region in a vertical direction. Upon detection of the vertical movement the image of said soft-button 324 is correspondingly displaced in accordance with said vertical movement and the contribution of the first ingredient in the beverage to be prepared is correspondingly adapted. Therewith the user can easily control the composition of the beverage to be prepared. User control of the composition is even more intuitive if a boundary between regions in the holder 322 filled with the first and the second color 3221, 3222 follows the vertical movement of the first soft-button 324.

In an embodiment, not shown here, the first soft-button 324 may alternatively or in addition be movable in a direction x (also denoted as second control direction) transverse to the vertical direction of the holder 322 wherein the transverse position determines a feature of said first ingredient. A combination of control options assigned to one soft-button extends the options of the user to adjust the features of the beverage to be prepared. The fact that the optional further movement is transverse to the vertical movement, but that the same soft-button is used for this purpose clarifies that it is associated to the same ingredient but another feature thereof. A feature that can be controlled in this way may be for example a composition of said first ingredient, e.g., in a blend of coffees. Therein an extreme left position may indicate pure coffee of a first type, an extreme right position may indicate pure coffee of a second type and a position between these extremes may indicate a blend of these coffees in a ratio corresponding to the position.

Another feature that may be controllable is an intensity. The wording intensify is used to indicate the degree of roasting of a coffee, its body and its bitterness. Also this feature may be represented symbolically by a row 325 of beans, wherein the number of highlighted ones thereof indicates the intensity. In the embodiment shown, a second soft-button 326 is provided that is at least movable in a direction corresponding to the horizontal direction of the holder 322. In this way the strength of the coffee can be controlled. This feature is also symbolically represented by a row 325 of beans, wherein the number of highlighted ones thereof indicates the currently set strength.

In an embodiment not shown here, the second soft-button 326 may be additionally or alternatively movable in a direction corresponding to the vertical direction of the holder 322 and wherein the vertical position determines the amount of the beverage to be prepared. This function may be visualized by adapting the filling level of the displayed holder 322 in accordance with the vertical movement of the second soft-button 326. Preferably therewith the ratio between the fractions that represent the contribution of the ingredients is maintained constant. In the embodiment shown the possible displacement directions of the soft-buttons 324, 326 are indicated by arrows thereon. In this case, the arrow on the first soft-button 324 indicate that this soft-button 324 is moveable in a vertical direction. The arrow on the second soft-button 326 indicates that the latter is moveable in a vertical direction. In another embodiment, however, the first soft-button 326 may likewise be further movable in a direction x (fourth control direction) transverse to the vertical direction y of the holder 322. In that case the transverse position may determine a feature of the second ingredient, e.g., a ratio of soy milk and cow milk or a blend of coffees. Alternatively, the transverse position of the second soft-button 326 may determine a global feature of beverage to be prepared, e.g., the temperature.

For each additional ingredient in the beverage to be prepared a further soft-button may be provided. It is noted that for controlling the ratio between N ingredients in the beverage a total number of N−1 buttons suffice, so that one button remains for controlling the total amount of the beverage to be prepared.

As indicated above, an information box 323 may provide textual data describing the selected recipe. If the user substantially changes the recipe by using the further control options in the second operational mode M2, this textual information may be faded away. This may be the case if the user sets one or more features of the beverage to be prepared to a value that deviates more than a predetermined amount (e.g., more than 10%) from a reference value.

In this embodiment a further information box 327 is present that indicates the filling degree of the holder 322. By way of example, the information box 327 shows a first, a second and a third cup provided with characters "S", "M" and "L" that respectively represent a small, a medium and a large cup. One of these is highlighted to indicate the currently made selection. The selection may be made by the vertical position of the second soft-button 326, but alternatively, or in addition by pointing one of the cups in the information box 327.

A still further information box 328 is presented in this embodiment allowing the user to select between a single cup or a double cup to be filled, by pointing within this information box to the field comprising the numeral 1 and the single cup or to the field comprising the numeral 2 and the double cup.

Optionally selection buttons 343 may be present to select one of a set of pre determine d blends.

Figure 6B:
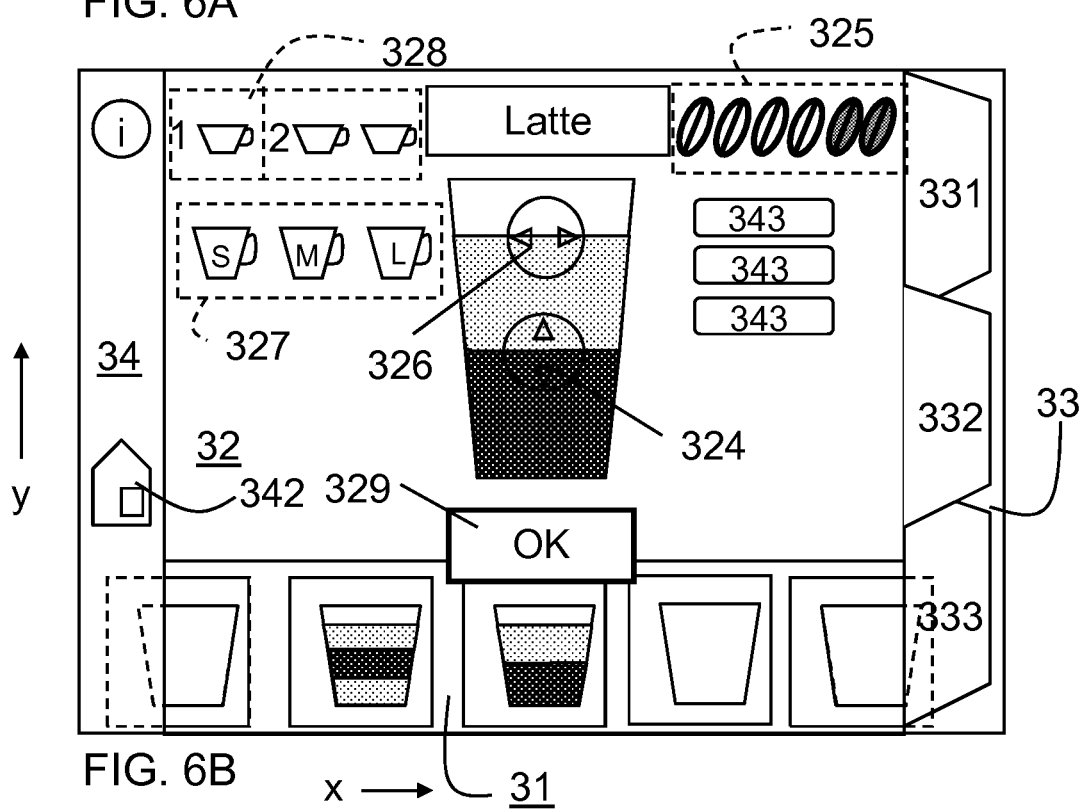
Figure 6C:
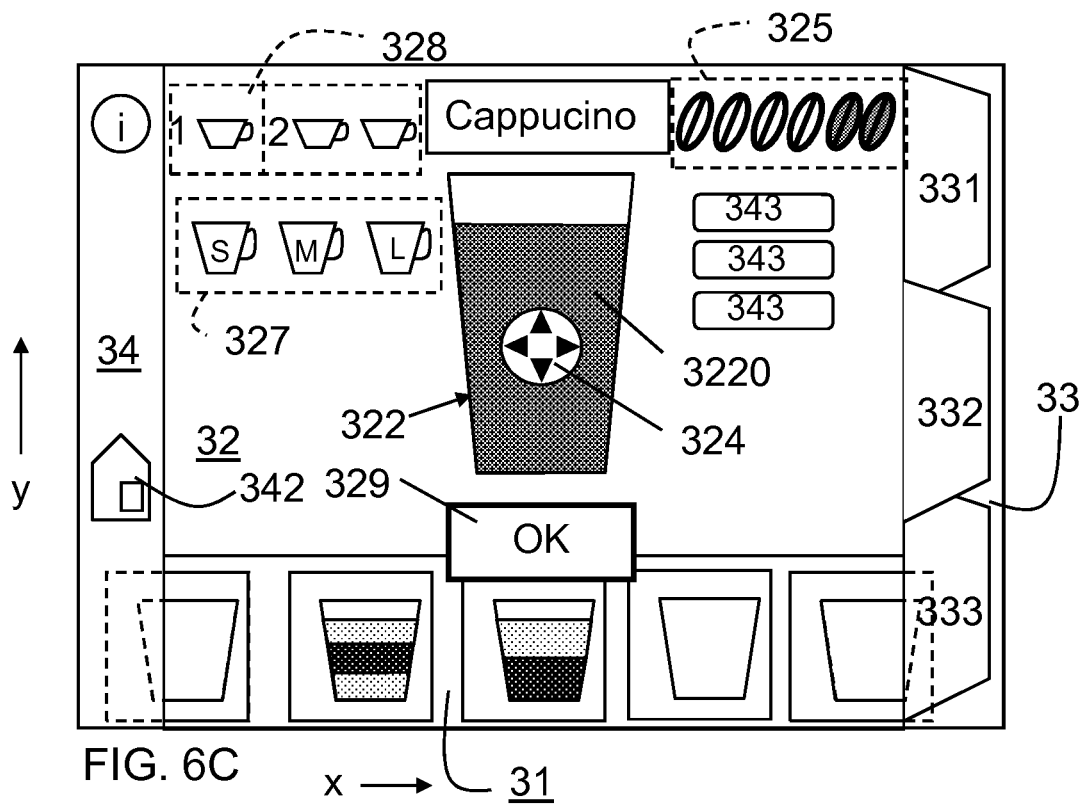
Figure 6D:
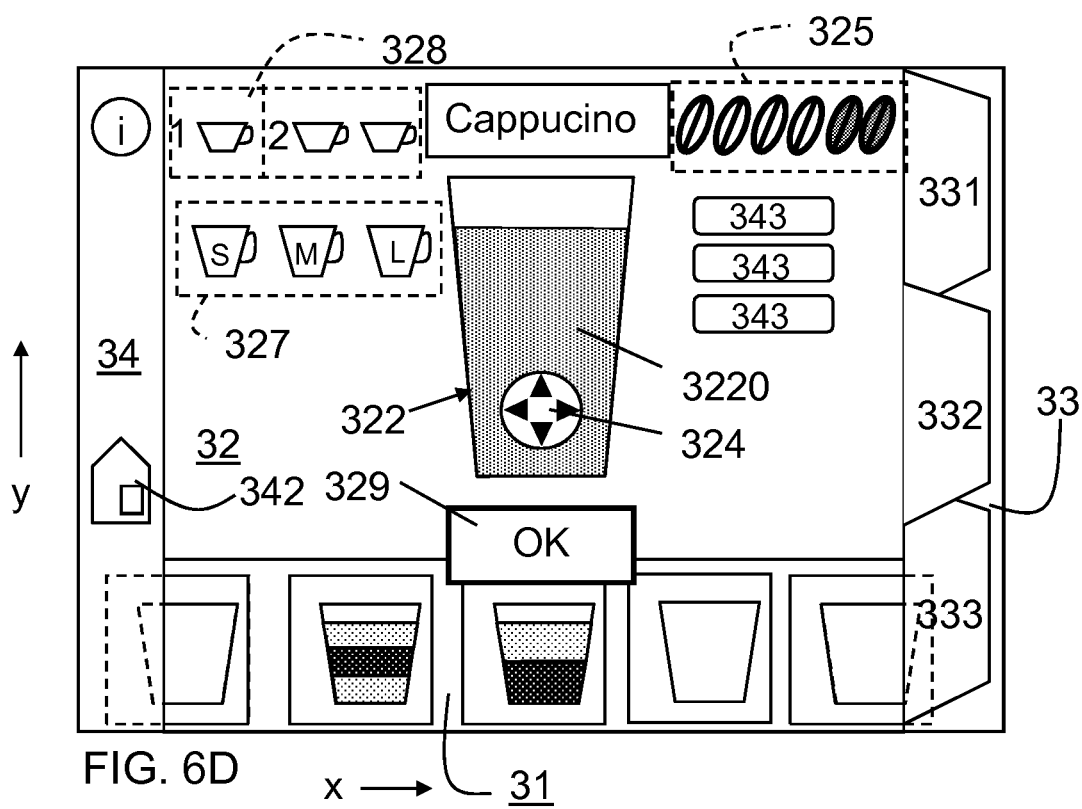

FIGS. 6C and 6D show an alternative embodiment. Parts therein corresponding to those in FIG. 6B have the same reference numeral. By way of example the selected beverage in this case is "Cappucino". However, the example is equally applicable to other types of beverages.

In this alternative embodiment of the beverage preparation device the filling 3220 of the holder has a color in the tuning mode M2 that is a weighted average of at least a first color indicative for a first ingredient and a second color indicative for a second ingredient. In the applied weighting the contribution of the first color corresponds to the fraction of the first ingredient and the contribution of the second color corresponds to the fraction of the second ingredient. By way of example the beverage has coffee as a first ingredient formed (represented by the color black) and milk (represented by the color white) as a second ingredient. As in the previous embodiment the relative amounts of the ingredients in the beverage to be prepared correspond to the composition control position (y) of the button 324. However, in this embodiment the appearance of the filling is adapted in that in the applied weighting the contribution of the colors is adapted to the relative amounts of the ingredients correspond to the composition control position (y). By way of example FIG. 6C shows a composition control position of the button 324 wherein the first and the second ingredient are present in approximately equal amounts. To indicate this, the filling 3220 of the holder is a darker shade of gray. In the example shown in FIG. 6D the user has shifted the soft-button 324 to a position corresponding to a composition having a relatively low amount of the first ingredient (coffee)

and a relatively large amount of the second ingredient (milk). This change in composition is indicated by displaying the filling 3220 of the holder with a lighter shade of gray.

Also in the embodiment shown in FIGS. 6C and 6D a further soft-button 326 may be provided that is movable in a direction y to control an amount of the beverage and in a direction x transverse to the amount control direction y. A position of the further soft-button 326 in the transverse direction determines a global feature of beverage to be prepared. The transverse position x of the further soft-button 326 may for example determine a temperature of the beverage to be prepared. This may be visualized by displaying more or less vapor above the holder in accordance with the beverage temperature. Alternatively, this may be visualized by displaying the filling of a holder with a color indicative for the beverage temperature, for example for example by a mixture of the colors blue and red in a ratio corresponding to the beverage temperature. Depending on which soft-button 324 or 326 was last used the filling 3220 of the holder 320 may be used to visualize the temperature or the composition of the beverage.

The transverse position x of the further soft-button 326 may alternatively determine a property of the second ingredient. For example if the second ingredient is milk the transverse position x may determine a ratio of constituents in said milk, e.g., a ratio between soy milk and cow milk.

The embodiment described with reference to FIG. 6B may likewise have a second soft-button 326 that is further movable in the transverse direction x and that can be used to determine a global feature of the beverage to be prepared or a property of the second ingredient.

In the graphical user interface shown in FIGS. 6B, 6C and 6D, the user can at any time start preparation of the beverage according to the selected recipe, here R4, and further adjusted with the available controls in operational mode M2, by "pressing" the soft-button OK with reference numeral 329. Upon this user input, denoted with uip6 in FIG. 3, the control unit assumes mode M3. Alternatively, or in addition a physical button may be provided to start preparation. In embodiments the user may be allowed to step back to operational mode M1 by selecting another beverage recipe from the elongate region 31.

Figure 7:
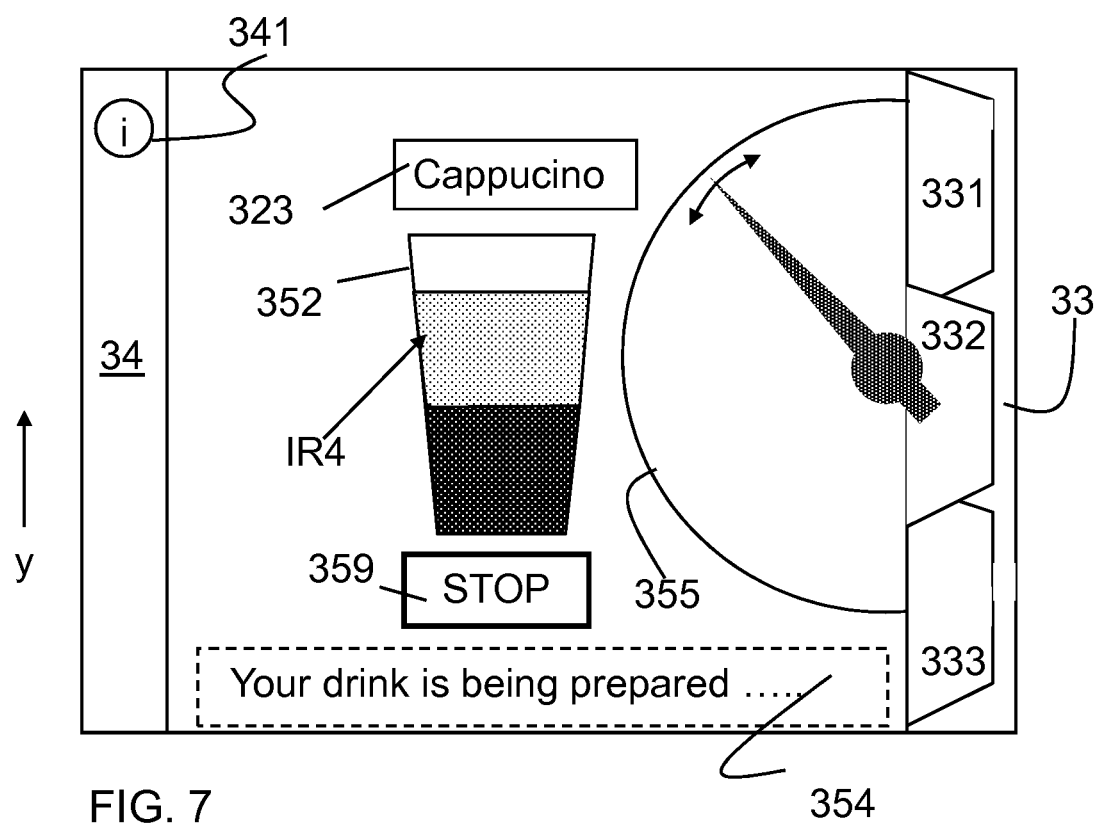

In operational mode M3 the process control unit 56 controls the beverage preparation unit 6 to have it prepare the beverage specified by the user. This operational mode M3 may be separately visualized to the user in various ways, for example by displaying a quivering manometer 355 on the screen 3, as illustrated in FIG. 7. In addition or alternatively an animation may be shown wherein the holder 352 shown on the display is gradually drained, preferably over a time-period corresponding to the time period used to prepare the beverage, to suggest the user that the content of the holder on the screen flows in the physical holder that is being filled. Alternatively, an animation may be shown wherein the holder 352 displayed on the screen 3 is gradually filled, again preferably over a time-period corresponding to the time period used to prepare the beverage. In operational mode M3, the display 3 may alternatively or in addition show a text message indicative for the preparation process. For example the message "Your drink is being prepared . . . " in message box 354. The user may be allowed to interrupt the preparation process by a stop button 359 that replaces the OK button in the previous operational mode. Once preparation is completed the control unit assumes the standby operational mode M0.

In an embodiment the control unit 5 has a time-out function that provides for a transition to a hibernate or a shut-off mode MX if no user interaction has taken place for a prolonged period of time. As indicated above, further operational modes M4, M5, may provide other forms of user interaction, or may support maintenance purposes for example.

Figure 8:
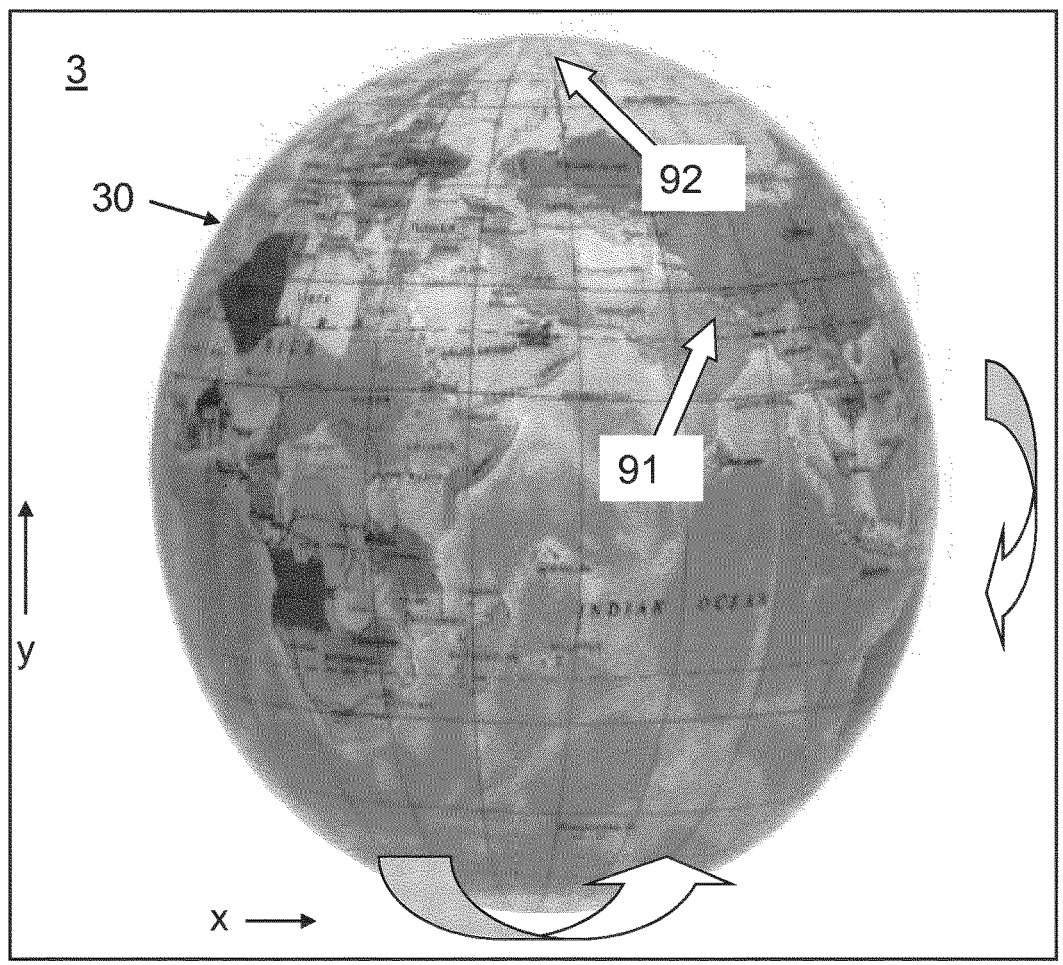

A still different embodiment of a beverage preparation device according to the present invention is now described with reference to FIG. 8. In this embodiment the control unit 5 is configured for mapping an image of a three-dimensional body 30 and the user is enabled to indicate a position on the mapped image. In the selection mode M1 the beverage preparation system is configured for identifying a region on the three-dimensional body from the indication of the position pointed to and for selecting one or more beverage recipes associated with said region. In this case the three-dimensional body 30 is a globe. Beverage recipes associated with a region may be recipes for beverages that are traditional for said region. Regions are for example countries. The associated one or more beverage recipes may be traditional recipes for such country. The country Italy may for example be associated with coffee recipes such as Lungo, Espresso and Latte Macchiato. Alternatively regions may be associated with beverages that can be prepared from ingredients originating from those regions. For example Robusta coffee may be selected by pointing to sub-Saharan Africa or an Arabica coffee may be selected by pointing to the Arabian Peninsula. Alternatively the correspondence may be the physical circumstances of the region pointed to. For example indication by the user of one of the poles may correspond to the selection of ice water. By way of example in situation 91 the user points to India. Upon detection that this country is indicated the control unit 5 provides a list of most popular beverages in this country and allows the user to select one thereof. The selectable beverages provided in this way may for example be presented with the graphical user interface described with reference to FIGS. 6, 6A and 6B. However alternatives are possible. For example, the selectable beverages may be presented in a numbered list and the user may enter a number to select the beverage. In situation 92 the user points to the North Pole. This region has only one corresponding selectable beverage, here ice-water, so that no further selection is necessary, and the control unit can immediately proceed to the tuning mode M2, or even to the preparation mode M3.

The globe 30 has a user controllable orientation in that the control unit is configured for determining a movement of a point of contact by a physical object on the touch-sensitive panel 4 and for providing a mapping wherein the three-dimensional body is rotated around an axis, which rotation causes a mapped surface of the three-dimensional body 30 to displace in a direction corresponding to the direction of movement of the point of contact. For example if a movement in the direction x is determined, the control unit 5 will apply a rotation around the axis through the poles, so that the mapped surface of the globe also displaces in the direction x.

In another embodiment the globe may have a fixed orientation, or the globe may rotate continuously.

Figure 9:
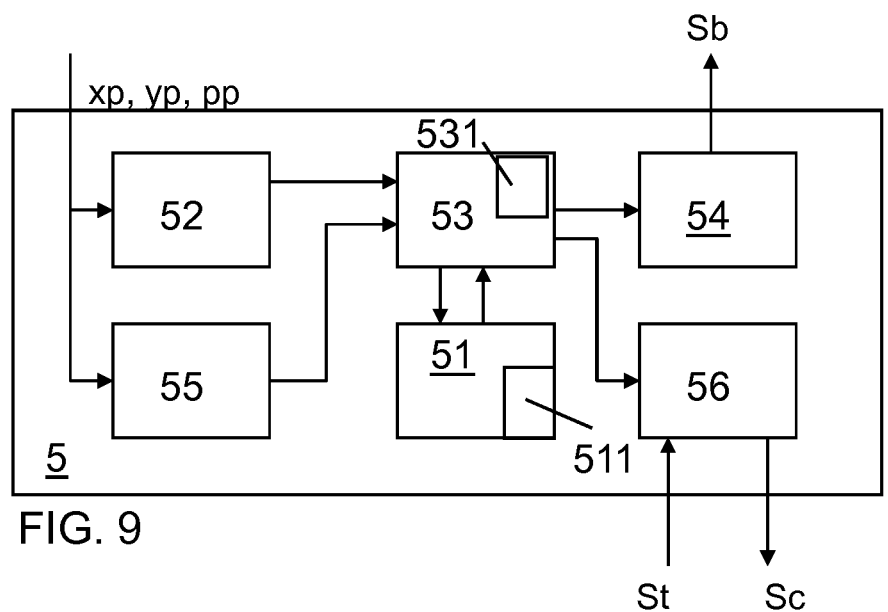
FIG. 9 shows in more detail a control unit in an embodiment of the automatic system, FIG. 10 schematically shows an embodiment of a method according to the invention.

FIG. 9 shows in more detail a control unit 5 in an embodiment of the invention. Therein the control unit comprises a storage facility 51 having stored therein a sequence of selectable beverage recipes as well as corresponding image data for visually representing these beverage recipes. The recipes specify the required composition and way of preparing for each selection. Recipes may for example be provided for Lungo, Espresso, Macchiato, Cappuccino, Latte, Café au lait and Wiener mélange. Characteristic image data may be any image data enabling the user to discriminate between the various recipes. Even a brief description may be used to present the recipes, e.g., the conventional names used for these beverages. In another embodiment the storage facility stores a lookup table 511. The lookup table 511 specifies for each region one or more beverage recipes associated therewith. The beverage recipes associated with a region are for example recipes for traditional beverages, or beverages that can be prepared with ingredients available in the region.

The control unit 5 further comprises a mapping module 53 that is arranged for mapping image data to screen space. The image data is for example image data corresponding to respective beverage recipes in a list of beverage recipes. Alternatively, the image data to be mapped may be a three-dimensional object. The mapping module 53 may comprise a coordinate transform facility 531 for example in the form of dedicated hardware to apply a coordinate transformation from model coordinates to screen coordinates. The control unit 5 may for example have a dedicated transform facility 531 for mapping an image of a three-dimensional object. Furthermore the control unit 5 comprises a display control unit 54 for controlling the display panel 3.

The control unit 5 further comprises a motion detection module 52 for detecting a motion of an indicated position, e.g., by swiping movement of the users finger. In an embodiment it may be required that the touch sensitive panel 4 is touched. In another embodiment it may be sufficient that the users finger moves close enough to the surface of the touch sensitive panel 4.

The control unit further comprises an identification module 55 for determining whether a region on the screen is selected and to identify an object that corresponds to this region, for example using a lookup table that associates the screen coordinates of a position pointed to with an index in a further lookup table with a list of recipes. The identification module 55 may apply an inverse coordinate transformation to take into account a coordinate transformation applied to the image data.

The control unit further comprises a process control module 56 for controlling the beverage preparation process with control signals Sc and using status information received from the preparation unit 6.

An embodiment of a method according to the invention for preparing a beverage is schematically shown in FIG. 10.

According to the first step S1 shown in FIG. 10 a beverage preparation system is provided. The beverage preparation system may be provided as a single beverage preparation device 1, but may alternatively be provided as a beverage preparation device 1 in combination with a portable device 10. Such a portable device may comprise user profile information, such as preferred settings of the beverage preparation device for each time of the day. The beverage preparation device 1 (e.g., as illustrated in FIGS. 1,2 and 3) to be provided has a preparation unit 6 for preparing a beverage, a display panel 3 defining a screen space and integrated therewith a touch sensitive panel 4. The beverage preparation device 1 further has a control unit 5 for controlling the preparation unit with user guidance obtained from the touch sensitive panel 4 and for providing visual feedback to the display panel 3. The touch sensitive panel 4 is arranged for generating a position signal xp, yp indicative for a position pointed to and may further provide a pressure signal pp, indicative for a pressure exerted at the position xp, yp.

The method of FIG. 10 further comprises a step S2, information about selectable beverage recipes is stored. The beverage recipe information may for example be stored as a sequence of selectable beverage recipes as well as corresponding image data for visually representing these beverage recipes is stored, i.e. maintained in a storage space. For example, the beverage recipes R1, . . . Rn and image data are stored in a memory 51, as shown in FIGS. 3 and 6A, 6B, that may be retrieved from another storage and may for example be provided as embedded data in a program. Alternatively or in addition the beverage recipes R1, . . . Rn and corresponding image data may be provided by users of the device 1. In another embodiment the beverage recipe information may be stored in a lookup table 511 that associates respective regions on a surface of a three-dimensional body with one or more recipes from which a selection may be made.

In a third step S3 image data is mapped to screen space to visualize the selections available to the user. In an embodiment respective image data for each recipe is mapped to screen space and displayed as recipe images in respective display regions in a, typically elongate recipe selection zone of the display panel at mapping positions arranged according to a length direction of recipe selection zone in a predetermined order for example corresponding to the order of the beverage recipes in the sequence, for example as shown in FIGS. 6, 6A and 6B. In another embodiment a three-dimensional body is mapped to screen space as shown in FIG. 8. Therein the three dimensional body has regions on its surface that are associated with respective sets of one or more recipes. Also other embodiments are possible wherein the image data is a list of recipe names.

In step S4 if is defected whether a beverage recipe is selected, e.g., by pointing at a display region within the elongate zone comprising the recipe image for that recipe. If this is the case (Y), control flow continues with step S6, otherwise (N) control flow continues with step S5. The selection may alternatively indication of a region on a three-dimensional body, possibly in combination with a second selection process, e.g., selection from a menu, In step S5 if is defected whether a movement of a physical object on or near the touch sensitive display panel is detected. For example it is detected in step S5 whether a motion occurs in the length direction of the elongate zone 31 in the graphical user interface of FIG. 5. If said motion occurs control flow continues with step S3 after adapting in step S6 parameters for the mapping in step S3 by changing the mapping position of recipe images in accordance with the detected motion. An example thereof is illustrated in FIGS. 6A and 6B illustrating a change in mapping position caused by swiping to the right. As a result the sequence of recipe images moves also to the right, wherein recipe images at one end, here at the right, disappear from the elongate zone, and at the other end, here at the left appear. Alternatively, in the embodiment having the user interface shown in FIG. 8, detection of a physical object on or near the touch sensitive display panel has the effect that a mapping is provided wherein the three-dimensional body is rotated around an axis, wherein the rotation causes a mapped surface of the three-dimensional body to displace in a direction corresponding to the direction of movement of the point of contact.

If it was detected in step S4 that a beverage recipe, e.g., R4, was selected, the user may be enabled in step S7 to provide further input, for example in order to tweak the beverage recipe before it is prepared. This option is further illustrated with reference to FIGS. 6A-6D. More in particular, in this step the display panel displays a holder 322 with a filling 3220 corresponding to a beverage recipe and with at least one soft-button 324 in its interior. The at least one soft-button is movable. This allows the user to control a feature of a beverage to be prepared in accordance with a position the soft-button in a control direction thereof. The user is provided with additional information indicative of a setting for the feature that is controlled in this way. By way of example the following options features maybe available in step S7.

A soft-button is movable in a first control direction to control a relative contribution of an ingredient in the beverage and the additional information is an appearance of the filling in said holder.

A soft-button is movable in a second control direction to control an intensity of an ingredient and the additional information is a row of icons of which a number is highlighted in accordance with the intensity controlled with the soft-button.

A soft-button is movable in a third control direction to control the amount of the beverage to be prepared, wherein the additional information is a level to which the holder is filled.

A soft-button is movable in a fourth control direction to determines a composition of an ingredient and the additional information is a graphical representation of the composition.

A soft-button is movable in a fifth control direction to control a temperature of the beverage and the additional information is a graphical representation of the temperature.

A soft-button may control more than one feature, provided that the control directions associated with the features controlled by the soft-button are mutually different, preferably transverse to each other. Preferably features controlled by the same soft-button are associated with each other. For example a same soft-button may be used to control the amount and the temperature of the beverage. In this case the features are associated to each other in that they both relate to the beverage as a whole. For example a same soft-button may be used to control the relative contribution of an ingredient in the beverage and an intensity of the ingredient. In that case the features are associated to each other in that they both relate to a particular ingredient in the beverage.

Subsequent to step S7 or directly after step S4 the beverage is prepared in step S8 in accordance with the beverage recipe and if applicable according to said further user input. The preparation method may be visualized in various ways, as is described with reference to FIG. 7.

According to an aspect of the invention a computer program is provided that executes the steps S3 to S7 of the method. The program may be stored on a record carrier, e.g., a hard disk, an optical disk or a flash memory and may be executed by the controller 5 of the apparatus.

Alternatively dedicated hardware may be provided that controls part or all of the device.

An at least partly programmable implementation of the control unit has the advantage that the associated software can easily be replaced, e.g., to improve the interaction with the user. The replacement software may be loaded, for example, via the internet. On the other hand a fast and efficient rendering of visual information may be achieved with dedicated hardware in the form of a graphics accelerator.

Although the present invention has been shown in detail on the basis of examples and described in the drawings and the preceding description, the invention is not limited to these examples. Other variations of the exemplary embodiments disclosed may be understood and used on the basis of the description, the drawings and the claims by the skilled person in carrying out the claimed invention. In the claims, the word "comprising" does not exclude other elements or steps. The indefinite article "a" does not exclude plurality. A single processor or unit can in practice carry out functions of different elements recited i the claims. The mere fact that some features are mentioned in mutually different claims does not exclude the possibility of a favorable combination of those features. Thus, for example, it is conceivable that the different embodiments of the control unit are used in one and the same device, as desired. Reference numerals in the claims are understood not to limit the scope of protection of the claims.

What is claimed is:

1. A beverage preparation system with a preparation unit for preparing a beverage, comprising:
    a display panel defining a screen space;
    a touch sensitive panel;
    a control unit that controls the preparation unit with user guidance obtained from the touch sensitive panel, and provides visual feedback to the display panel;
    wherein
        the touch sensitive panel is arranged to generate a position signal indicative of a position pointed to,
        wherein the control unit further causes the display panel to display a holder with a filling corresponding to a beverage recipe as well as with at least one soft-button disposed in an interior of the holder,
        wherein the at least one soft-button is movable in at least a first control direction and a second control direction different from the first control direction,
        wherein movement of the at least one soft-button in the first control direction controls a relative contribution amount of an ingredient to modify the beverage recipe, and movement of the at least one soft-button in the second control direction controls a characteristic of the ingredient in the beverage, and
        wherein the control unit further modifies an appearance of the filling in the holder based on the relative contribution amount of the ingredient, and prepares the modified beverage recipe in accordance with the position of the at least one soft-button in said at least first and second control directions.

2. The beverage preparation system according to claim 1, wherein the control unit is configured to modify the appearance of the filling in the holder in that the filling of the holder is displayed with a plurality of parts representative for a plurality of ingredients and comprising at least a first part with a first appearance and a second part with a second appearance that occupy respective fractions of said filling indicative for respective amounts of a first ingredient and a second ingredient of said plurality of ingredients in the beverage to be prepared and wherein the appearance of the filling is adapted by adapting a position of a boundary between the first and the second part in the first control direction.

3. The beverage preparation system according to claim 2, wherein the position of the boundary between the first and the second part of the filling is adapted to coincide with the position of the soft-button.

4. The beverage preparation system according to claim 1, wherein the control unit is configured to modify the appearance of the filling in the holder in that the filling of said holder has a color that is a weighted average of a plurality of colors including at least a first color indicative for a first ingredient and a second color indicative for a second ingredient, wherein in the applied weighting the contribution of each color in the plurality of the colors corresponds to the fraction of the ingredients indicated by said each color, wherein the first color corresponds to the fraction of the first ingredient and the contribution of the second color corresponds to the fraction of the second ingredient.

5. The beverage preparation system according to claim 1, wherein the characteristic controlled by the position of the at least one soft-button in the second control direction is an intensity of the ingredient and wherein additional information is provided to the user in accordance with the position of the at least one soft-button, wherein the additional information is a row of icons of which a number is highlighted in accordance with the intensity controlled with the soft-button.

6. The beverage preparation system according to claim 1, wherein the at least one soft-button comprises a further soft-button movable in a third control direction wherein a position of the further soft-button in the third control direction determines the amount of the beverage to be prepared, and wherein additional information is provided to the user in accordance with the position of the further soft-button, wherein the additional information is a level to which the holder is filled.

7. The beverage preparation system according to claim 6, wherein a level to which the holder is filled is adapted to coincide with the position of the further soft-button.

8. The beverage preparation system according to claim 7, wherein the control unit is configured to modify the appearance of the filling in the holder in that the filling of the holder is displayed with a plurality of parts representative for a plurality of ingredients and comprising at least a first part with a first appearance and a second part with a second appearance that occupy respective fractions of said filling indicative for respective amounts of the first ingredient and the second ingredient in the beverage to be prepared and wherein upon adaptation of the level, the ratio between the fractions that represent the contribution of the ingredients is maintained constant.

9. The beverage preparation system according to claim 1, wherein the characteristic controlled by the position of the soft-button in said second control direction determines a composition of an ingredient and wherein additional information is provided to the user in accordance with the position of the at least one soft-button, wherein the additional information is a graphical representation of said composition.

10. The beverage preparation system according to claim 1, wherein the at least one soft-button comprises a soft-button of movable in a fifth control direction wherein a position of the soft-button in said fifth control direction determines a temperature of the beverage to be prepared, and wherein additional information is provided to the user in accordance with the position of the soft-button, wherein the additional information is a graphical representation of the temperature.

11. The beverage preparation system according to claim 1, wherein the control unit is further configured to enable the user to select a recipe for a beverage to be prepared from a sequence of selectable beverage recipes representing beverage preparation control information and the control unit therein performing the following steps:
mapping image data corresponding to respective beverage recipes from said sequence in respective regions in a recipe selection zone of the display panel in a predetermined order at mapping positions along a mapping direction of said recipe selection zone,
detecting whether a movement of a physical object on or near the touch sensitive display panel along the mapping direction occurs,
upon detection of such a movement applying a corresponding change in the mapping position of recipe images,
for enabling the user to select a beverage recipe from beverage recipes presented by their corresponding recipe image in the recipe selection zone.

12. The beverage preparation system according to claim 11, wherein the control unit before performing the step of mapping image data corresponding to respective beverage recipes performs the step of sliding a series of image data corresponding to the subsequence of beverage recipes to be shown.

13. The beverage preparation system according to claim 12, wherein the sliding movement is accompanied by a highlight moving along a path alongside the series of corresponding image data in a direction opposite to the sliding movement.

14. The beverage preparation system according to claim 12, wherein the control unit is further configured for determining if a region in the recipe selection zone is selected, and upon such detection being configured to select the beverage recipe corresponding to said region and to display the image data corresponding to said beverage recipe.

15. The beverage preparation system according to claim 14, wherein the image data corresponding to the selected beverage recipe is displayed in a zone separate from the recipe selection zone.

16. The beverage preparation system according to claim 1, wherein the control unit is further configured to enable the user to select a recipe for a beverage to be prepared, in which configuration the control unit performs the steps of mapping an image of a three-dimensional body, the user being enabled to indicate a position on the mapped image, and of identifying a region on the three-dimensional body from the indication of the position pointed to and for selecting one or more beverage recipes associated with said region.

17. The beverage preparation system according to claim 16, wherein the three-dimensional body has a user controllable orientation in that the control unit is configured for determining a movement of a point of contact by a physical object on the touch-sensitive panel and for providing a mapping wherein the three-dimensional body is rotated around an axis, which rotation causes a mapped surface of the three-dimensional body to displace in a direction corresponding to the direction of movement of the point of contact.

18. The beverage preparation system according to claim 1, wherein when enabling user control of a relative contribution amount in addition to textual information indicative for the selected beverage recipe is presented in an information zone, and wherein said textual information is faded away when the user sets one or more features of the recipe to be tuned to a value deviating more than a predetermined amount from a reference value for said recipe.

19. A method for preparing a beverage, the method comprising the steps of:
providing a beverage preparation system with a preparation unit for preparing a beverage, with a display panel defining a screen space and having integrated therewith a touch sensitive panel and with a control unit for controlling the preparation unit with user guidance obtained from the touch sensitive panel and for providing visual feedback to the display panel, the touch sensitive panel being arranged for generating a position signal indicative of a position pointed to, the method further comprising:

providing a recipe for a beverage to be prepared, subsequently, enabling the user to tune said recipe, therewith carrying out the following sub-steps, displaying a holder with a filling corresponding to the selected recipe as well as at least one soft-button in an interior of the holder, the at least one soft-button being movable in at least a first control direction and a second control direction different from the first control direction, enabling a user to move the soft-button in at least one of the first and second control directions by determining whether a point of contact by a physical object on the touch-sensitive panel coincides with the soft-button, detecting whether said coinciding point of contact moves along the at least one of the first and second control directions, and by updating the position of the soft-button in accordance with said movement, controlling a contribution of an ingredient and a characteristic of the beverage to be prepared in accordance with a position of the at least one soft-button in said at least one first and second control directions respectively to modify the recipe, and modifying an appearance of the filling in the holder based on the relative contribution amount of the ingredient, and preparing the beverage with the modified recipe.

20. A computer program product stored on a non-transitory computer readable medium for controlling a beverage preparation system for preparing a beverage, wherein the beverage preparation system comprises:

a preparation unit for preparing a beverage;

a display panel that defines a screen space;

a touch sensitive panel; and a control unit that controls the preparation unit with user guidance obtained from the touch sensitive panel and provides visual feedback to the display panel, the touch sensitive panel being arranged for generating a position signal indicative of a position pointed to, wherein the computer program product when executed by the control unit carries out the following steps:

providing a recipe for a beverage to be prepared, subsequently enabling a user to tune said recipe, therewith carrying out the following sub-steps:

displaying a holder with a filling corresponding to the selected recipe as well as at least one soft-button in an interior of the holder, the at least one soft-button being movable in at least a first control direction and a second control direction different form the first control direction, enabling the user to move the soft-button in at least one of the first and second control directions, by determining whether a point of contact by a physical object on the touch-sensitive panel coincides with the soft-button, detecting whether said coinciding point of contact moves along the at least one of the first and second control directions, and by updating the position of the soft-button in accordance with said movement, controlling a contribution of an ingredient and a characteristic of the ingredient in accordance with a position of the at least one soft-button in the first and second control directions respectively to modify the recipe, and modifying an appearance of the filling in the holder based on the relative contribution amount of the ingredient, and preparing the beverage with the modified recipe.

21. A beverage preparation system according to claim 1, comprising a beverage preparation device and a portable device for controlling the beverage preparation device, wherein the beverage preparation device at least comprises the beverage preparation unit and the portable device at least comprises the display and the touch sensitive panel integrated therewith, wherein the beverage preparation device and the portable device further comprise a facility for wireless communicating with each other.

\* \* \* \* \*